(12) United States Patent
Satake et al.

(10) Patent No.: US 7,681,681 B2
(45) Date of Patent: Mar. 23, 2010

(54) METER DEVICE OF MOTORCYCLE

(75) Inventors: Hidenori Satake, Shizuoka (JP);
Katsumitsu Wakamatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 573 days.

(21) Appl. No.: 11/697,204

(22) Filed: Apr. 5, 2007

(65) Prior Publication Data
US 2007/0284172 A1    Dec. 13, 2007

(30) Foreign Application Priority Data
Apr. 6, 2006    (JP)    ............................. 2006-105418

(51) Int. Cl.
*B62D 39/00*    (2006.01)
(52) U.S. Cl. ...................... 180/219; 362/473
(58) Field of Classification Search ................ 180/219, 180/218, 220; 296/180.1, 191; 362/473; 73/493; 280/288.4
See application file for complete search history.

(56) References Cited

FOREIGN PATENT DOCUMENTS

| EP | 1 496 241 | 1/2005 |
|----|-----------|--------|
| JP | 06-032270 | 2/1994 |

*Primary Examiner*—Tony H. Winner
(74) *Attorney, Agent, or Firm*—Keating & Bennett, LLP

(57) ABSTRACT

A meter device of a motorcycle decreases wind pressure caused by a travel wind without increased cost or design restrictions. A first portion of the meter device housing is positioned between the indicator portions and is inclined rearwardly upward to be directed above a rider's head. A second portion of the meter device housing is positioned forwardly of the indicator portions and is inclined rearwardly upward to be directed above the rider's head. In this manner, a front wall of the housing is curved in shape such that a central portion thereof in the vehicle width direction is positioned foremost and both sides thereof sweep back to produce a wind protection effect.

18 Claims, 9 Drawing Sheets

[Fig. 1]
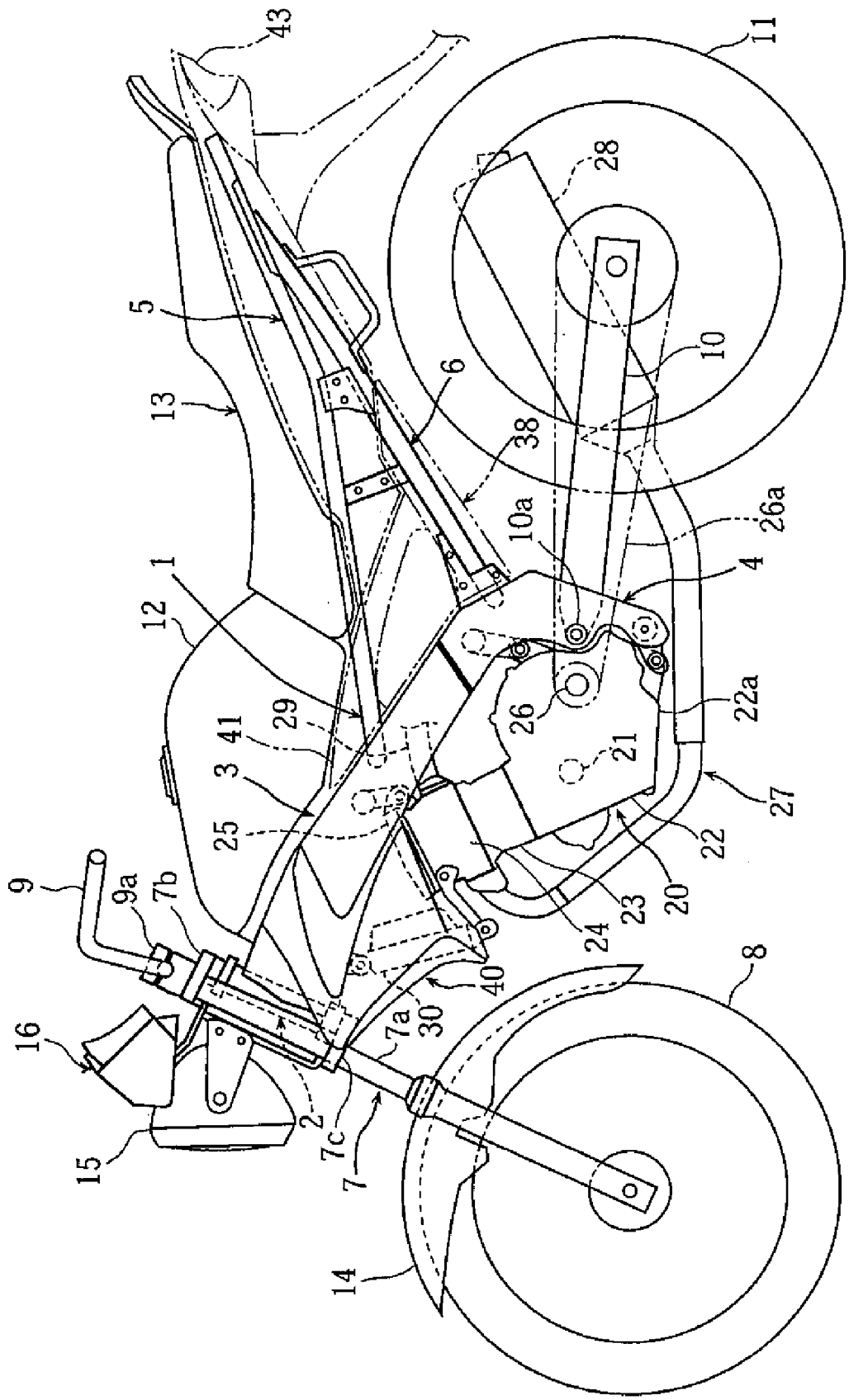

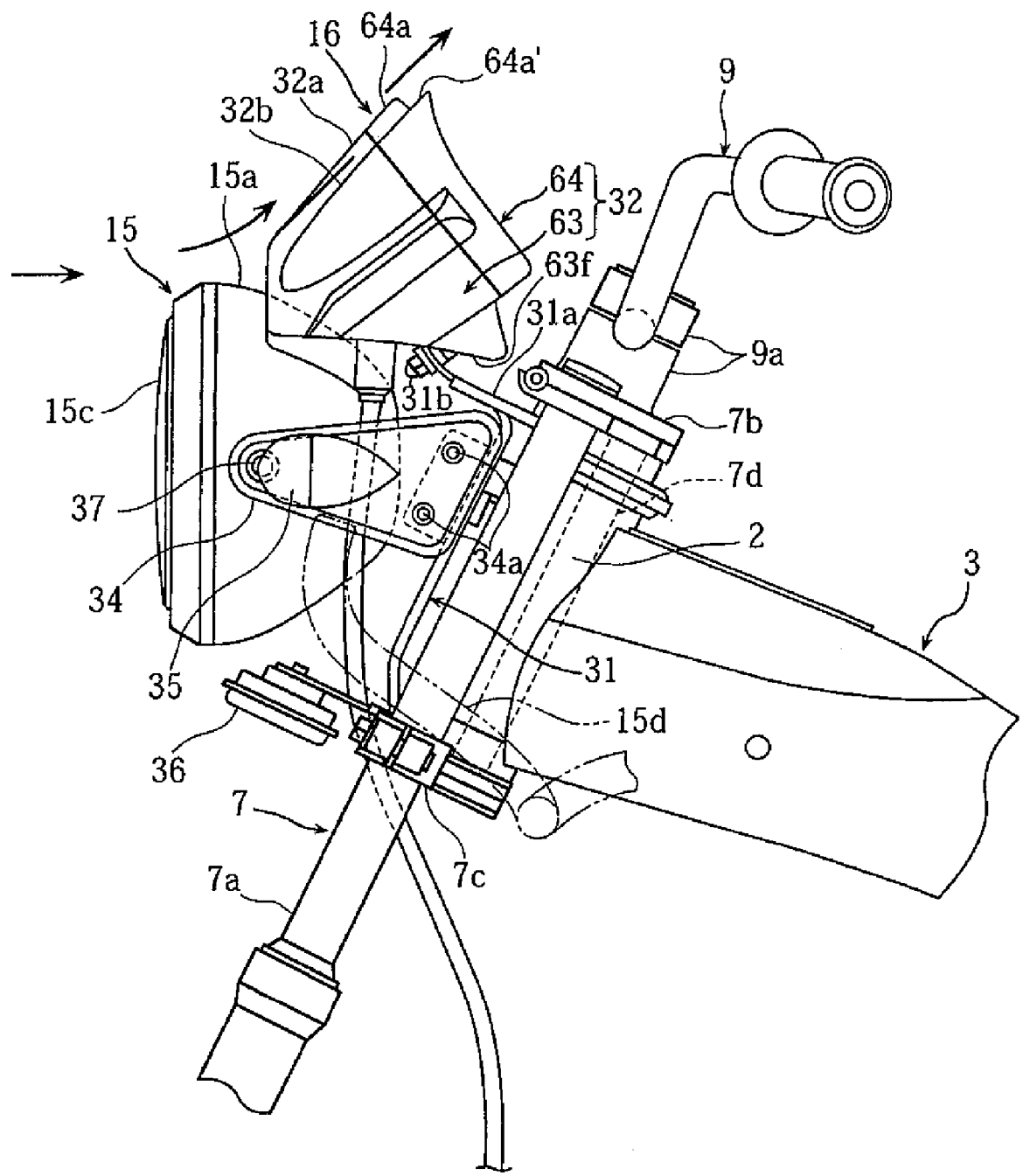
[Fig. 2]

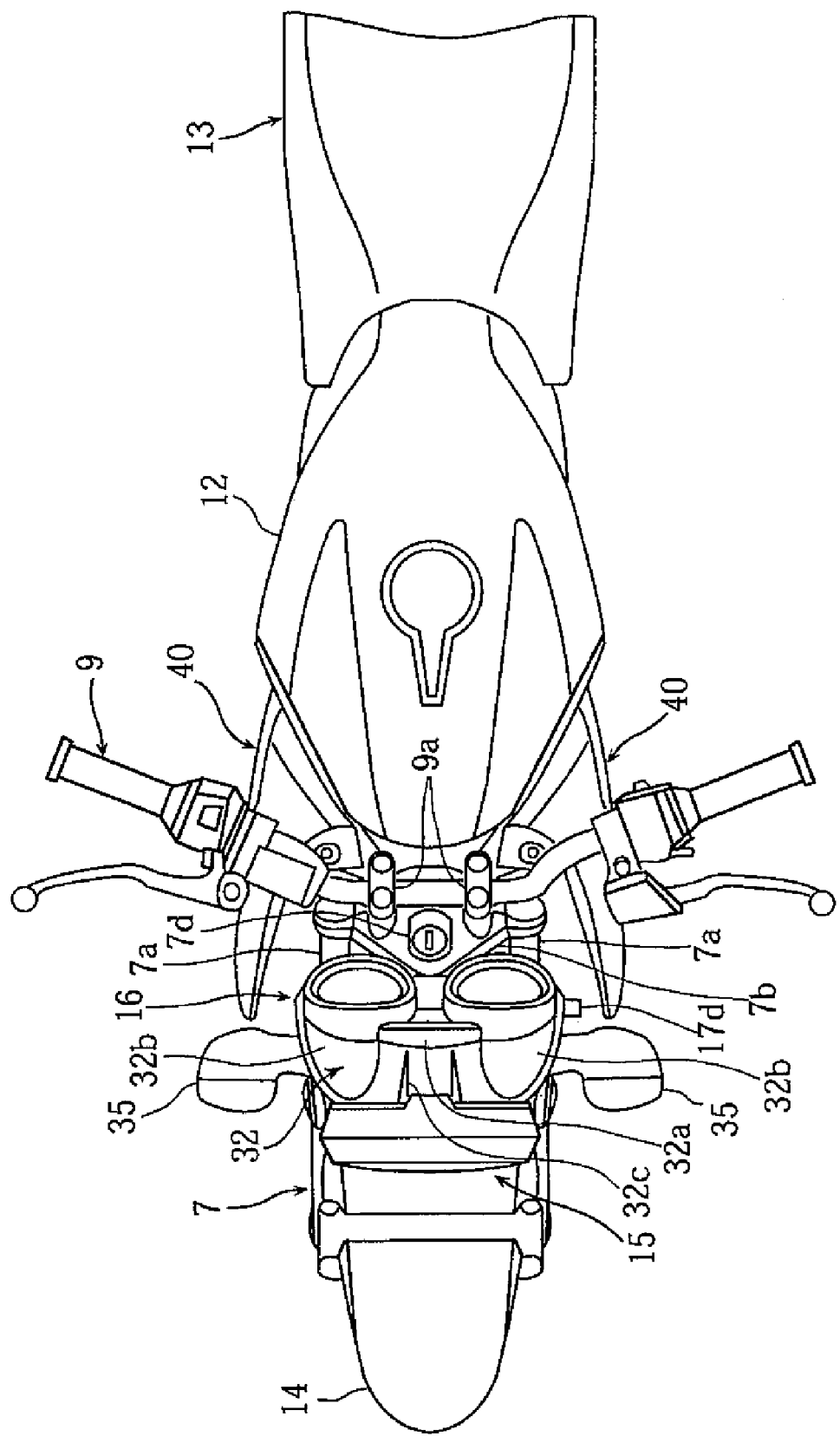
[Fig. 3]

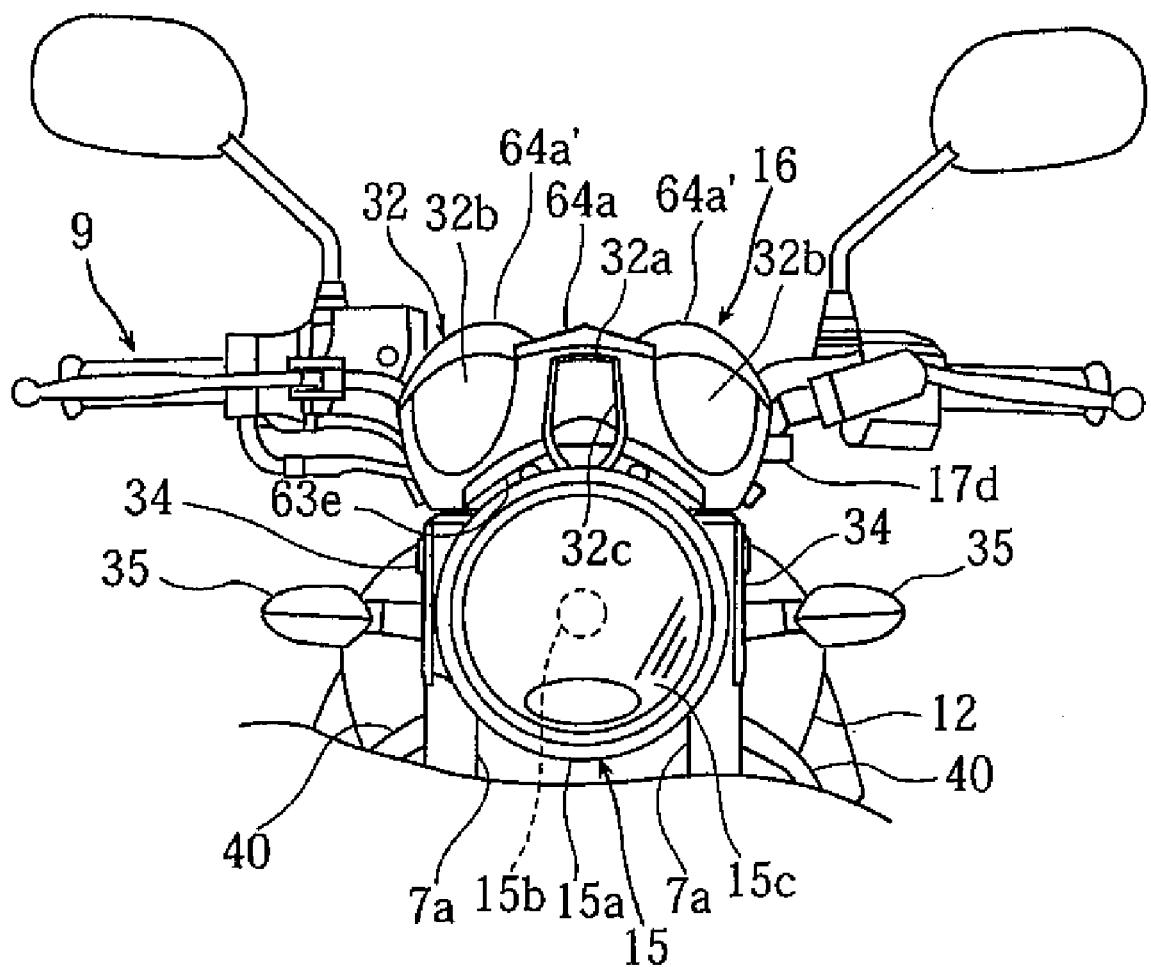
[Fig. 4]

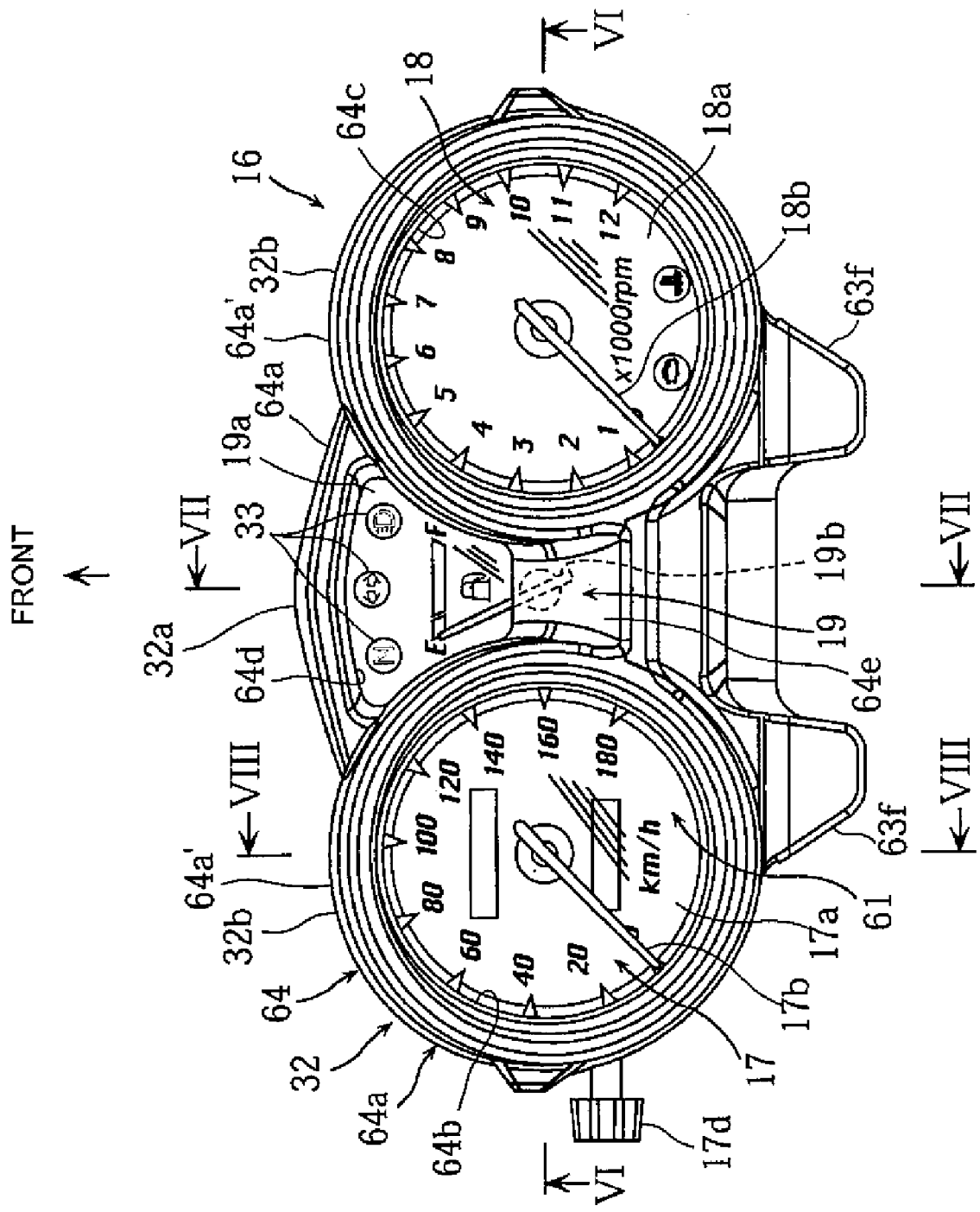
[Fig. 5]

[Fig. 6]
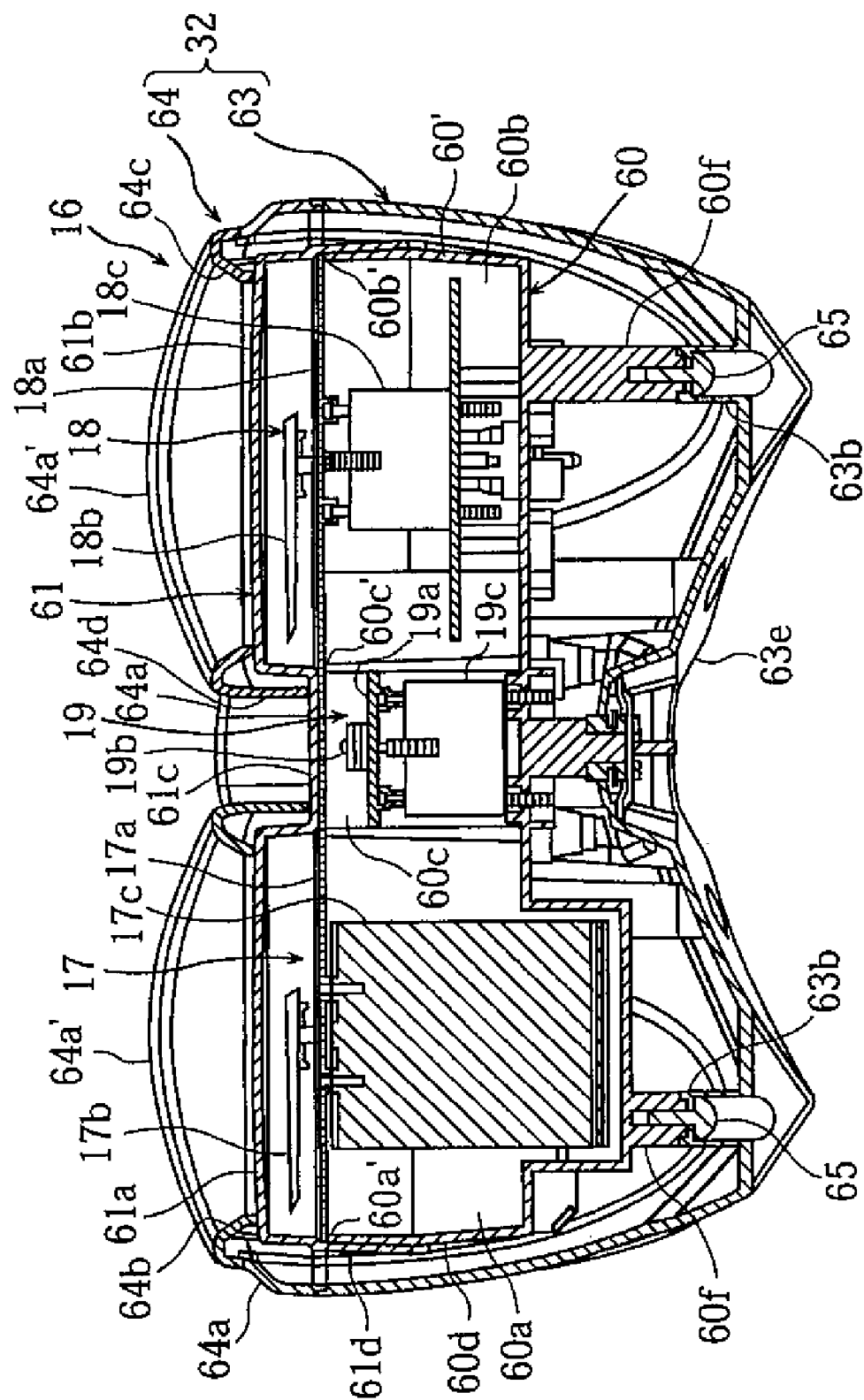

[Fig. 7]
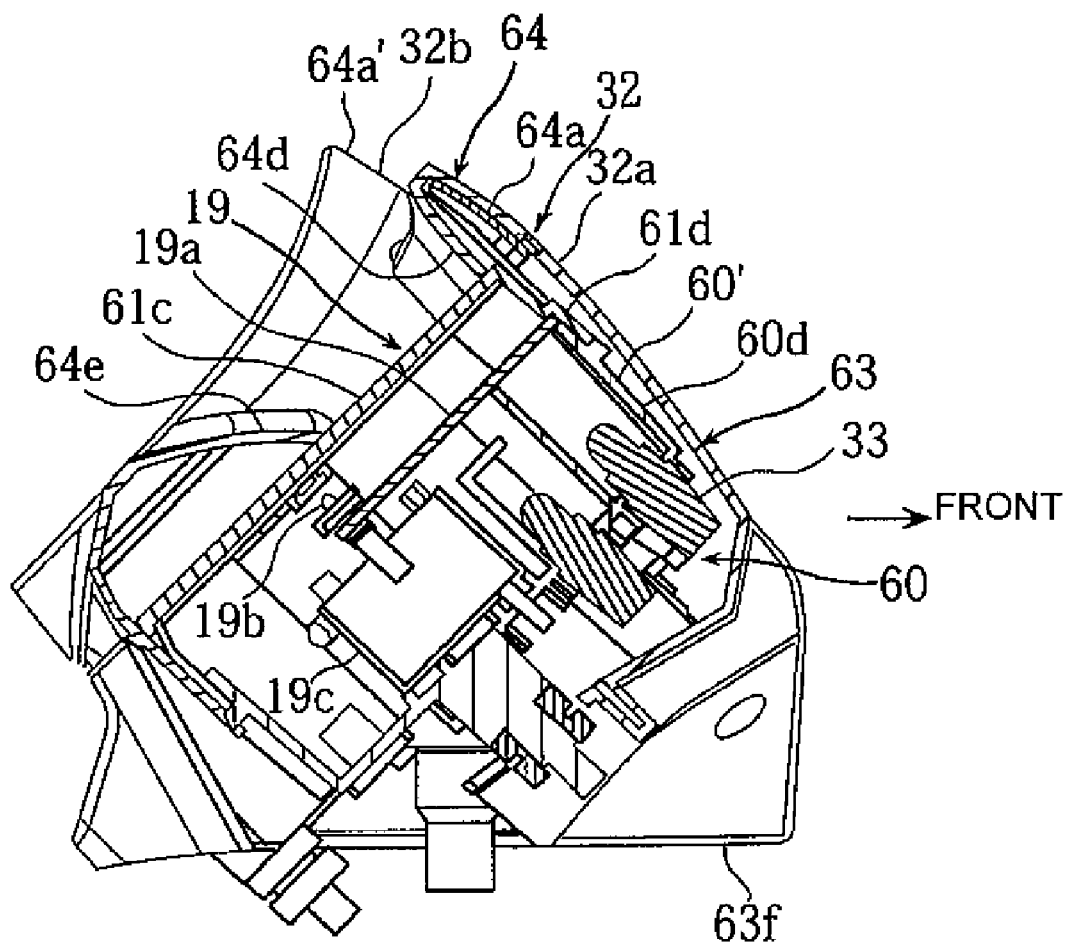

[Fig. 8]
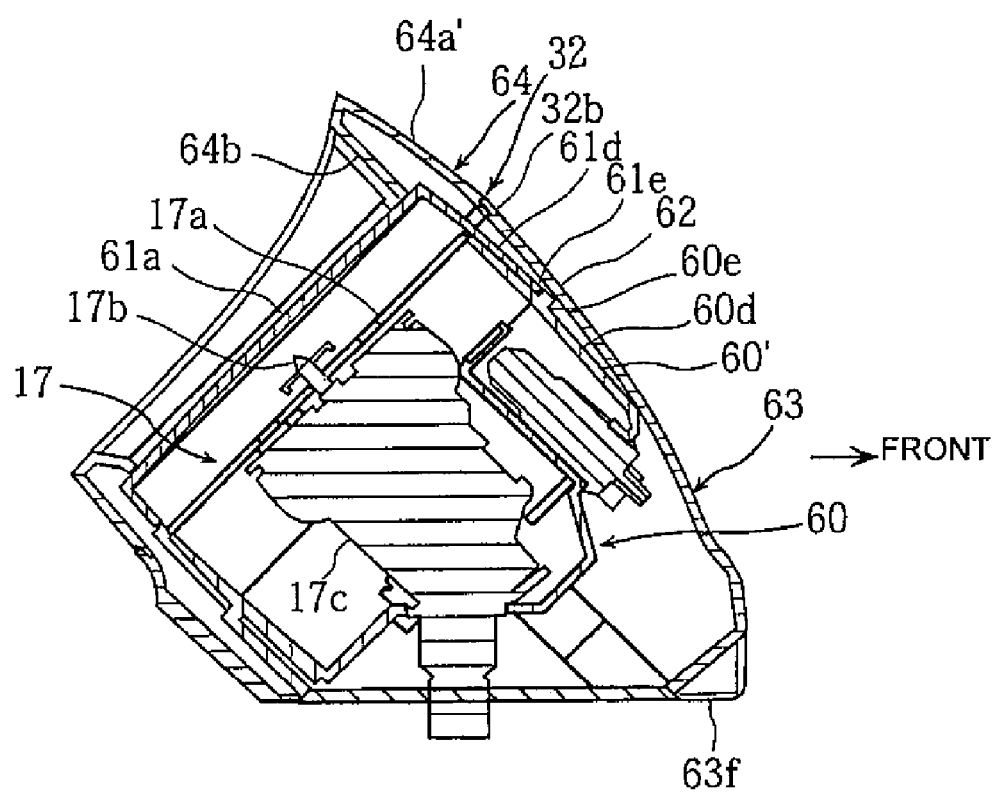

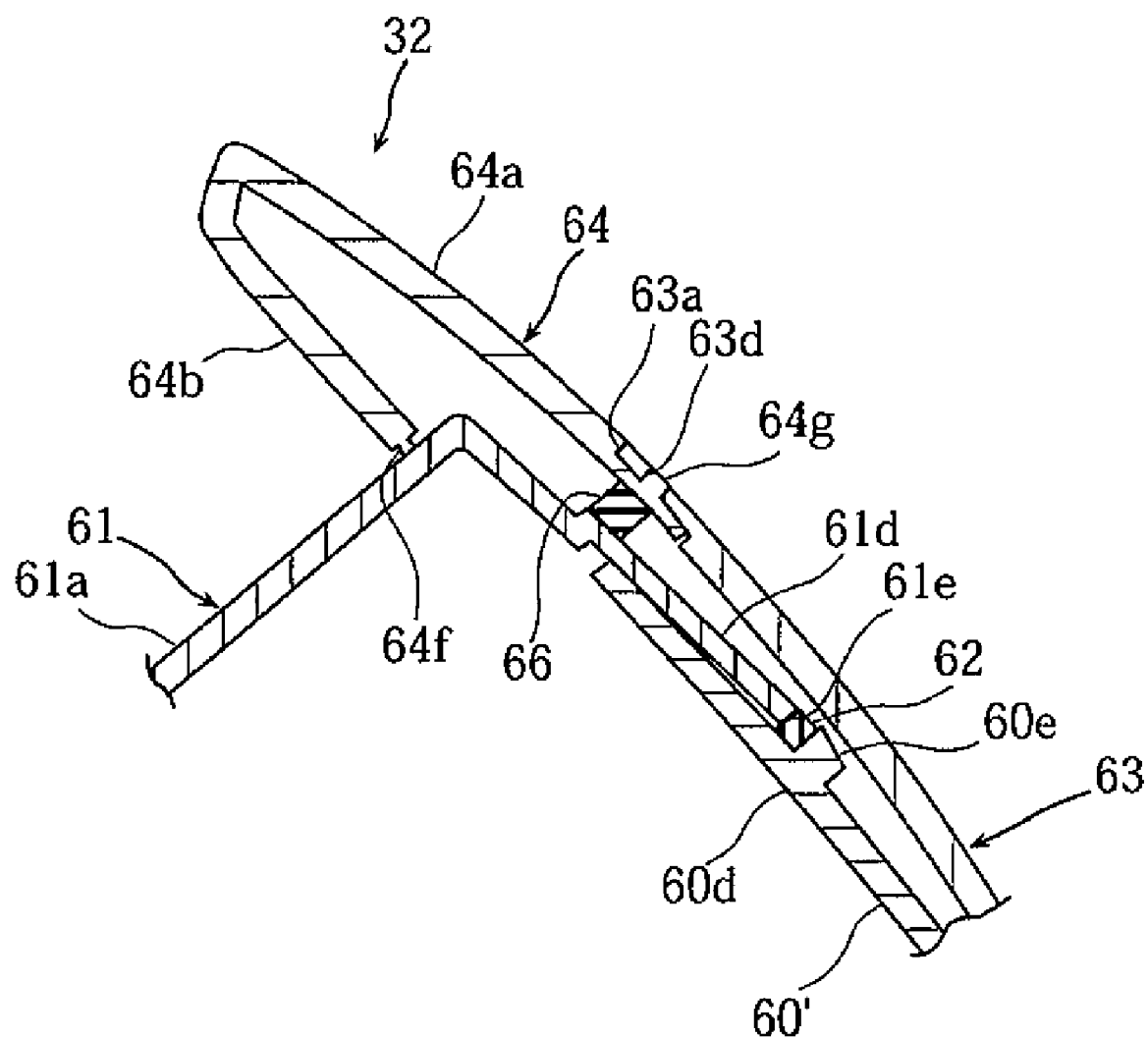
[Fig. 9]

US 7,681,681 B2

METER DEVICE OF MOTORCYCLE

RELATED APPLICATIONS

This application claims the benefit of priority under 35 USC 119 of Japanese patent application no. 2006-105418, filed on Apr. 6, 2006, which application is hereby incorporated by reference in its entirety.

BACKGROUND OF THE INVENTION

1. Field of the Invention

The present invention relates to a meter device for a motorcycle, and in particular to a meter device having a plurality of indicator portions aligned and arranged in a vehicle width direction and a housing that supports the indicator portions.

2. Description of Related Art

Some motorcycles have a meter device, mounted above a headlight, in which left and right, independent speed meters and tachometers are aligned and arranged in a vehicle width direction (see, for example, Japanese Patent Number 3313765).

Also, in some motorcycles, wind pressure caused by a travel wind imposes an undesirable load on the rider. It is desirable to decrease such wind pressure.

Decreasing the wind pressure has not been taken into consideration in motorcycles provided with conventional meter devices.

SUMMARY OF THE INVENTION

The invention provides a meter device for a motorcycle that decreases wind pressure caused by a travel wind.

A meter device for a motorcycle according to the invention comprises a plurality of independent indicator portions aligned and arranged in a vehicle width direction and a housing that supports the indicator portions. A first portion of the housing is positioned between the indicator portions and is inclined rearwardly upward to be directed above a rider's head. A second portion of the housing is positioned forwardly of the indicator portions and is inclined rearwardly upward to be directed above the rider's head.

With the meter device according to the invention, the second portion and the first portion, which correspond to a front wall of the housing, are inclined rearwardly upward, thereby decreasing wind pressure by leading travel wind to a neighborhood above a rider's head. The first portion is in the same position as that of, or projects forwardly of the second portion as viewed from laterally of the motorcycle. A portion corresponding to a front wall of the housing is curved in shape such that a central portion thereof in the vehicle width direction is positioned foremost and both sides thereof sweep back. This configuration produces a wind protection effect, and decreases wind pressure though small in size. By contrast, if the first portion is dented rearwardly of the left and right second portions (in contrast to the invention) the travel wind flows concentratedly on the dented portion and strikes directly against the rider's head and face, which does not decrease wind pressure.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle with a meter device according to an embodiment of the invention.

FIG. 2 is a side view of the meter device.

FIG. 3 is a plan view of the meter device.

FIG. 4 is a front view of the meter device.

FIG. 5 is a view of the meter device from the perspective of a rider.

FIG. 6 is a cross sectional view of the meter device taken along line VI-VI of FIG. 5.

FIG. 7 is a cross sectional view of the meter device taken along line VII-VII of FIG. 5.

FIG. 8 is a cross sectional view of the meter device taken along line VIII-VIII of FIG. 5.

FIG. 9 is a cross sectional view of a part of a housing of the meter device.

DETAILED DESCRIPTION OF THE INVENTION

An embodiment of the invention is now described below with reference to the accompanying drawings.

FIGS. 1-9 illustrate a meter device for a motorcycle, which is an example of a vehicle according to an embodiment of the invention. In the following description, the terms "front", "rear", "left" and "right" refer to directions from a perspective of a rider seated on the seat.

In the drawings, reference numeral 1 denotes a body frame of a motorcycle comprising a head pipe 2 positioned at a front end of body frame 1, left and right tank rails 3, 3 extending obliquely and downwardly from head pipe 2 toward the rear, left and right rear arm brackets 4, 4 extending downwardly from and contiguous to rear ends of tank rails 3, 3, left and right seat rails 5, 5 extending obliquely and upwardly from tank rails 3, 3 toward the rear, and left and right seat stays 6, 6 bridging rear portions of seat rails 5, 5 and arm brackets 4, 4.

A front fork 7 is supported by head pipe 2 to afford left and right steering. A front wheel 8 is journaled at a lower end of front fork 7 and a steering handle 9 is mounted to an upper end thereof. A front fender 14 is arranged on front fork 7 to cover an upper portion of front wheel 8.

Front fork 7 includes a pair of left and right fork bodies 7a, 7a, an upper bracket 7b and an underbracket 7c, which connect left and right fork bodies 7a, 7a together. A steering shaft 7d, which connects upper bracket 7b and underbracket 7c together, is journaled through a bearing by head pipe 2. Steering handle 9 is fixed to upper bracket 7b through a handle crown 9a. A main switch 7d is arranged in front of steering handle 9 on upper bracket 7b.

Front ends of rear arms 10 are supported on arm brackets 4, 4 and swing vertically about a pivot shaft 10a. A rear wheel 11 is journaled by rear ends of rear arms 10 and rear suspensions (not shown) are arranged between rear arms 10 and rear arm brackets 4.

A fuel tank 12 is mounted on tank rails 3, 3 and a double ride seat 13 is mounted on seat rails 5, 5 rearwardly of fuel tank 12.

A water-cooled type four-stroke engine 20 is mounted below tank rails 3, 3. Engine 20 comprises a cylinder block 23, a cylinder head 24, and a head cover 25 laminated on and bolted to a crank case 22. A crank shaft 21 is accommodated and arranged horizontally in a vehicle width direction in crank case 22.

A transmission case 22a, in which a transmission (not shown) is accommodated, is formed integrally on the rear of crank case 22. An output shaft 26 is arranged on transmission case 22a to take out engine rotation through the transmission, and rear wheel 11 is rotationally driven through a chain 26a by output shaft 26.

An exhaust pipe 27 is connected to a front wall of cylinder head 24. Exhaust pipe 27 passes below engine 20 and connects to a muffler 28 arranged on the right side of rear wheel 11. An intake pipe 29 is connected to a rear wall of cylinder head 24. Intake pipe 29 extends rearward between tank rails 3, 3 and connects to an air cleaner (not shown). A radiator 30 is arranged forwardly and upwardly of engine 20 to maintain engine cooling water at a predetermined temperature.

Front ends of tank rails 3, 3 and an outside of the radiator 30 are covered by resin front covers 40, 40. Front covers 40, 40 function as an air scoop, through which a travel wind is introduced into radiator 30.

Outsides of seat rails 5, 5 and seat stays 6, 6 are covered by left and right resin side covers 38, 38. A tail light 43 is mounted to rear ends of side covers 38, 38.

A headlight 15 is mounted to front fork 7 forwardly of head pipe 2. Headlight 15 is circular as viewed from the front of the motorcycle and extends over the entire width of left and right fork bodies 7a, 7a.

Headlight 15 comprises a bulb 15b mounted detachably to a rear end in a substantially bowl-shaped light case 15a, which is opened toward the front and covered by a lens 15c. Reference numeral 15d denotes a power cable.

Upper and lower ends of a fork bracket 31 that bridges brackets 7b and 7c are fixed to upper bracket 7b and under-bracket 7c. A pair of left and right head light stays 34, 34 extend forward and are clamped and fixed to an upper portion of fork bracket 31. A forwardly extending meter stay 31a is formed at an upper end of fork bracket 31.

Flasher lights 35, 35 are mounted to left and right head light stays 34, 34 and project outward in the vehicle width direction.

Headlight 15 is mounted to front ends of left and right head light stays 34, 34 by left and right mount screws 37, 37 so that an optical axis angle can be adjusted.

A horn 36 is mounted to fork bracket 31 below headlight 15.

A meter device 16 is mounted to meter stay 31a by left and right bolts 31b above headlight 15.

Meter device 16 includes a meter body 60, a housing 32, in which meter body 60 is accommodated and supported, and a lens 61 that covers an indicator portion of meter body 60. Meter body 60 accommodates, in a body case 60', a circular speed indicator portion (speed meter) 17, an engine speed indicator portion (tachometer) 18, a substantially sector-shaped fuel reserve indicator portion (fuel meter) 19, and neutral, turn signal, and high-beam indicators 33, 33, 33. Speed indicator portion 17 and engine speed indicator portion 18 are independent and are aligned and arranged at a predetermined interval in the vehicle width direction, and fuel reserve indicator portion 19 is arranged between indicator portions 17, 18. Indicators 33 are aligned and arranged forwardly of fuel reserve indicator portion 19 in the vehicle width direction.

Body case 60' is common to indicator portions 17-19 and defines, in an interior thereof, speed, rotating speed and fuel reserve indicator chambers 60a, 60b, 60c, in which indicator portions 17-19 are respectively accommodated. Openings of the indicator chambers are directed obliquely upward and rearward to be directed toward a rider.

Speed indicator portion 17 includes a disk-shaped speed indicator panel 17a arranged on an opening 60a' of speed indicator chamber 60a, a speed indicator pointer 17b, and a drive part 17c, which rotationally drives speed indicator pointer 17b. A reset knob 17d of a trip meter, which projects outside from housing 32, is connected to drive part 17c.

Engine speed indicator portion 18 includes a disk-shaped engine speed indicator panel 18a arranged on an opening 60b' of engine speed indicator chamber 60b, an engine speed indicator pointer 18b, and a drive part 18c, which rotationally drives engine speed indicator pointer 18b.

Fuel reserve indicator portion 19 is arranged obliquely forwardly and downwardly of speed indicator portion 17 and engine speed indicator portion 18 as viewed in plan view, and includes a fuel reserve indicator panel 19a arranged on an opening 60c' of fuel reserve indicator chamber 60c, a fuel reserve indicator pointer 19b, and a drive part 19c that rotationally drives fuel reserve indicator pointer 19b.

A common lens 61 is arranged on body case 60' to cover openings 60a'-60c' of indicator chambers 60a-60c. Lens 61 includes left and right indicator lens portions 61a, 61b that cover speed indicator portion 17 and engine speed indicator portion 18, and a middle (inbetween) indicator lens portion (first lens portion) 61c that covers fuel reserve indicator portion 19 between indicator portions 17, 18.

The middle indicator lens portion 61c is indented such that it is positioned obliquely forwardly and downwardly of indicator lens portions 61a, 61b.

As shown in enlarged scale in FIG. 9, lens 61 includes a cylindrical-shaped engagement wall portion 61d extending obliquely forwardly and downwardly of an outer peripheral edge thereof to overlap an outer peripheral wall 60d of body case 60'. An annular stopper portion 60e is protrusively formed on outer peripheral wall 60d to face a lower end surface 61e of engagement wall portion 61d with a sealing member 62 therebetween. Thereby, watertight sealing is provided between body case 60' and lens 61.

Housing 32 includes a bottom, cylindrical-shaped lower housing 63, which accommodates and supports meter body 60, and a substantially lid-shaped upper housing 64 mounted to an edge of an opening 63a of lower housing 63 to be contiguous thereto. Left and right edges of housing 32 are positioned outwardly of left and right edges of headlight 15 in the vehicle width direction as viewed from the front.

Bottom, cylindrical-shaped mounts 63b, 63b are formed on a bottom of lower housing 63 to extend obliquely rearwardly and upwardly. Obliquely forwardly and downwardly projecting boss portions 60f, 60f are formed on body case 60'. Lower housing 63 is fixed to meter body 60 by clamping mounts 63b, 63b to boss portions 60f, 60f with mount screws 65, 65 (see FIG. 6).

Upper housing 64 includes an outer peripheral wall 64a contiguous to lower housing 63 to extend obliquely rearwardly and upwardly, circular-shaped left and right inner peripheral walls 64b, 64c bent inwardly from an upper end of outer peripheral wall 64a to extend obliquely forwardly and upwardly to surround outer peripheral edges of speed indicator portion 17 and engine speed indicator portion 18, and an inner wall 64d connecting left and right inner peripheral walls 64b, 64c together and surrounding an outer peripheral edge of fuel reserve indicator portion 19. A rear portion 64e of inner wall 64d covers a base of fuel reserve indicator pointer 19b (see FIG. 5).

Left and right, front, outer peripheral walls 64a' of upper housing 64 project so as to assume the form of a pent roof rearwardly of outer peripheral wall 64a between the indicator portions (see FIGS. 6 and 7). Outer peripheral walls 64a' increase visibility of speed indicator portion 17 and engine speed indicator portion 18 as viewed from a rider.

As shown in FIG. 9, pointed portions 64f are formed on inner end surfaces of left and right inner peripheral walls 64b, 64c and inner wall 64d of upper housing 64 to abut against, respectively, left and right indicator lens portions 61a, 61b and middle indicator lens portion 61c. Engagement projections 64g are formed at predetermined circumferential intervals on a front edge of outer peripheral wall 64a of upper housing 64. Engagement holes 63d, with which engagement projections 64f engage, are formed on opening 63a of lower housing 63.

Upper housing 64 is fittingly fixed to lower housing 63 by abutting pointed portions 64f against lens portions 61a-61c and engaging engagement projections 64g with engagement holes 63d, and pushing lens 61 against body case 60' with sealing member 62 therebetween. A sealing member 66 is interposed between engagement wall portion 61d of lens 61 and outer peripheral wall 64a of upper housing 64.

An arcuate recess 63e following an upper, outer surface of headlight 15 is formed on a front bottom of lower housing 63. Lower housing 63 and headlight 15 are arranged in relative positions, in which an upper edge of headlight 15 enters recess 63e. Thereby, the bottom of lower housing 63 overlaps the upper edge of headlight 15 as viewed from laterally of a vehicle.

A front wall of housing 32 includes a middle (in between) indicator portion front portion (first portion) 32a positioned between indicator portions 17, 18 and inclined rearwardly upward to be directed above a rider's head, and indicator portion front portions (second portion) 32b, 32b positioned forwardly of speed indicator portion 17 and engine speed indicator portion 18 and inclined rearwardly upward to be directed above a rider's head (see, e.g., FIGS. 2-4).

Middle indicator portion front portion 32a and left and right indicator portion front portions 32b, 32b form parts of upper housing 64 and lower housing 63 and mutually assume a substantially same configuration. More specifically, middle indicator portion front portion 32a bulges a little forwardly of left and right indicator portion front portions 32b, 32b as viewed from laterally of a vehicle (see FIG. 2). In addition, a central, lower portion 32c of middle indicator portion front portion 32a in the vehicle width direction is dented a little relative to other parts.

As viewed from a rider, housing 32 is curved so that middle indicator portion front portion 32a is positioned at a foremost end centrally in the vehicle width direction and left and right indicator portion front portions 32b, 32b are positioned outward in the vehicle width direction and rearward relative to middle indicator portion front portion 32a.

Folded surfaces 63f, 63f are formed on left and right sides of a lower edge of lower housing 63 to be contiguous to the bottom surface of lower housing 63 to extend rearward toward the rear of a vehicle.

According to the embodiment, since middle indicator portion front portion 32a inclined rearwardly upwardly of housing 32 projects forwardly of left and right indicator portion front portions 32b, 32b, wind pressure acting on a rider can be decreased.

More specifically, housing 32 has a curved shape, in which the wind protection effect is high, such that middle indicator portion front portion 32a is positioned at the foremost end centrally in the vehicle width direction and left and right indicator portion front portions 32b, 32b are positioned outward in the vehicle width direction and rearward relative to portion 32a. Thereby, housing 32 functions as a visor to produce a significant wind-pressure decreasing effect despite being small in size. By contrast, in a case where the middle indicator portion front portion is dented rearwardly of the left and right indicator portion front portions, the travel wind flows concentratedly on the dented portion and is liable to strike directly against the rider's head and face, such that a wind-pressure decreasing effect is not adequately produced.

Since the wind-pressure lessening effect is produced by configuring housing 32 so that middle indicator portion front portion 32a projects forwardly of left and right indicator portion front portions 32b, 32b, cost increases and design restrictions experienced when a visor is mounted as a separate part are avoided.

According to the embodiment, since middle indicator portion front portion 32a and left and right indicator portion front portions 32b, 32b are integrally formed, the number of parts and assembly time are reduced relative to a case where the portions are formed separately.

Also, since middle indicator portion front portion 32a and left and right indicator portion front portions 32b, 32b are made substantially the same in shape as viewed from laterally of a vehicle, the wind-pressure lessening effect is further increased.

According to the embodiment, since left and right, front, outer peripheral walls 64a' of upper housing 64 project obliquely rearwardly and upwardly of outer peripheral wall 64a of the middle indicator portion, left and right, front, outer peripheral walls 64a' function as a pent roof, so that the outward appearance as a double meter, and the visibility of the speed and engine speed indicator portions 17, 18 as viewed from a rider, are enhanced.

According to the embodiment, since the bottom of lower housing 63 overlaps the upper end of headlight 15 as viewed from laterally of a vehicle, an opposite side is not seen between headlight 15 and housing 32, thereby preventing degradation in outward appearance.

Also, since recess 63e on the bottom of lower housing 63 follows the upper surface of headlight 15, an outward appearance as if meter device 16 is mounted on headlight 15 is presented as viewed from laterally of a vehicle, so that the opposite side is surely not visible. Also, since the front portion of housing 32 is contiguous to the upper surface of headlight 15 inclined rearwardly upward, the wind-pressure lessening effect is heightened.

While an embodiment has been described with headlight 15 arranged below meter device 16, the invention is not so limited, and different on-board parts such as a horn, storage box, etc., from a headlight may be arranged below meter device 16.

According to the embodiment, since the folded surfaces 63f are formed on the lower edge of the lower housing 63 to extend rearwardly of a vehicle, the folded surfaces 63f can heighten the wind-pressure lessening effect and prevent an interior of the meter device 16 from being exposed outside.

According to the embodiment, since indicator portions 17-19 are covered by one common lens 61, the number of parts and assembly time are reduced relative to a case where the portions are covered by a plurality of lenses.

Also, since middle indicator lens portion 61c of lens 61 is formed obliquely forwardly and downwardly of left and right indicator lens portions 61a, 61b in a stepwise manner, fuel reserve indicator portion 19 is positioned back from speed and engine speed indicator portions 17, 18 whereby an outward appearance further like a double meter is obtained and the stiffness of lens 61 is increased.

In addition, while fuel reserve indicator portion 19 has been described as arranged between speed and engine speed indicator portions 17, 18, the invention is not so limited, and other indicator portions such as an engine temperature indicator portion, etc. may be provided or not.

The particular embodiments of the invention described in this document should be considered illustrative, rather than restrictive. Modification to the described embodiments may be made without departing from the spirit of the invention as defined by the following claims.

The invention claimed is:

1. A meter device of a motorcycle comprising a plurality of independent indicator portions aligned and arranged in a motorcycle width direction and a housing that supports the indicator portions, the housing comprising:
   a first portion positioned between the indicator portions and inclined rearwardly upward to be directed above a rider's head; and
   a second portion positioned forwardly of the indicator portions and inclined rearwardly upward to be directed above the rider's head.

2. The meter device according to claim 1, wherein the second portion and the first portion of the housing are integrally formed.

3. The meter device according to claim 1, wherein when viewed from laterally of the motorcycle, the second portion and the first portion of the housing have a substantially same shape.

4. The meter device according to claim 1, wherein at least a portion of the housing surrounding peripheries of the indicator portions, which is adjacent to the first portion of the housing, projects above the first portion in the direction of inclination.

5. The meter device according to claim 1, wherein when viewed from laterally of the motorcycle, a lower edge of the second portion of the housing overlaps an on-board part arranged below the meter device.

6. The meter device according to claim 5, wherein the on-board part is a headlight.

7. The meter device according to claim 6, wherein the headlight is circular in external shape as viewed from the front of the motorcycle.

8. The meter device according to claim 6, wherein the lower edge of the housing is formed to follow a shape along an outer surface of the headlight.

9. The meter device according to claim 1, wherein a folded surface extending toward the rear of the motorcycle is formed on a lower edge of the housing.

10. The meter device according to claim 1, wherein a single lens covers the indicator portions.

11. The meter device according to claim 10, wherein the lens includes a first lens portion that covers an area between the indicator portions and is positioned below an area that covers the indicator portions.

12. The meter device according to claim 11, wherein a further indicator portion is formed between the indicator portions and is covered by the first lens portion.

13. A meter device for a motorcycle comprising:
   right and left indicators configured to face a rear of the motorcycle; and
   a housing that houses the right and left indicators comprising right and left portions covering the right and left indicators and configured to face a front of the motorcycle, and a middle portion covering an area between the right and left indicators and configured to face the front of the motorcycle, wherein
   the middle portion projects forwardly of the right and left portions and is inclined rearwardly and upwardly, thereby decreasing wind pressure acting on the rider.

14. The meter device according to claim 13, wherein the right and left indicators comprise a speed meter and a tachometer.

15. The meter device according to claim 14, and further comprising a fuel reserve indicator in the area between the speed meter and the tachometer.

16. A motorcycle comprising the meter device of claim 13, wherein the meter device is mounted in a vicinity of a handlebar and above a headlight.

17. The motorcycle according to claim 16, wherein a contour of a bottom surface of the meter device housing matches a contour of an upper surface of the headlight.

18. A meter device for a motorcycle comprising:
   a housing having a front wall and a rear opening;
   right, left and middle indicators contained within the housing and facing the rear opening; and
   a lens covering the rear opening,
   wherein the front wall of the housing is curved in shape such that a central portion thereof in the vehicle width direction is positioned foremost and both sides thereof sweep back to produce a wind protection effect.

* * * * *